United States Patent
Hsieh et al.

(10) Patent No.: US 7,222,013 B2
(45) Date of Patent: May 22, 2007

(54) THROTTLE PHASE OUT CONTROL

(75) Inventors: Tung-Ming Hsieh, Carmel, IN (US); Adam C. Bennett, McCordsville, IN (US); Todd M Steinmetz, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 219 days.

(21) Appl. No.: 10/779,463

(22) Filed: Feb. 14, 2004

(65) Prior Publication Data

US 2005/0182546 A1 Aug. 18, 2005

(51) Int. Cl.
*B60T 7/12* (2006.01)

(52) U.S. Cl. .......................................... 701/87; 701/84

(58) Field of Classification Search ............ 701/54–90, 701/22; 180/197
See application file for complete search history.

(56) References Cited

U.S. PATENT DOCUMENTS

| | | | |
|---|---|---|---|
| 6,058,347 A * | 5/2000 | Yamamura et al. | 701/96 |
| 6,161,641 A * | 12/2000 | Fukumura et al. | 180/197 |
| 6,182,003 B1 * | 1/2001 | Maier-Landgrebe | 701/84 |
| 6,278,916 B1 * | 8/2001 | Crombez | 701/22 |
| 2001/0008988 A1 * | 7/2001 | Russell et al. | 701/54 |
| 2004/0162187 A1 * | 8/2004 | Suzuki | 477/182 |

* cited by examiner

*Primary Examiner*—Mark Hellner
(74) *Attorney, Agent, or Firm*—Dan L. Thompson (57) ABSTRACT

A vehicular powertrain has output torque established in accordance with various torque contributions in including throttle and brake torques. Throttle torque contribution is reduced proportionally to the amount of brake torque requested. Furthermore, such torque reductions are less aggressively applied with increasing throttle torques requested.

6 Claims, 5 Drawing Sheets

FIG. 6 of the present invention;

THROTTLE PHASE OUT CONTROL

TECHNICAL FIELD

The present invention is related to vehicular powertrain control. More particularly, the invention is concerned with resolving various operator torque requests into a final resultant output torque for a control of a vehicular transmission.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

Conventional powertrains in general are responsive to operator torque requests as may be provided by way of conventional throttle linkages to an internal combustion engine. Modern powertrains rely on torque based controls to determine a torque request from an accelerator pedal position where the accelerator pedal is not mechanically operatively coupled to an engine (e.g. throttle by wire). Hybrid powertrains generally rely upon a mechanically operatively decoupled accelerator pedal in determining the propulsion torque request from the vehicle operator, which propulsion torque may be delivered in various contributory splits from the internal combustion engine and the electric machine(s). Similarly, hybrid powertrains may provide all or a portion of braking torque by controlling regenerative operation of the transmission electric machine(s) or by controlling the electric machines in a fashion to transfer vehicle energy to the engine and dissipate that energy via engine braking in response to operator braking requests. Hybrid powertrains, therefore, are generally responsive to both accelerator pedal and service brake pedal requests to provide output torque in accordance therewith.

SUMMARY OF THE INVENTION

The present invention provides a method and apparatus for a vehicle for effectively resolving various torque requests into an output torque from the transmission of the powertrain. Accordingly, a first torque contribution, which may be a throttle torque contribution determined in accordance with an operator throttle request, is provided. Similarly, a second torque contribution, which may be a brake torque contribution determined in accordance with an operator brake request, is also provided. The first torque contribution is reduced in accordance with predetermined criteria. In a preferred embodiment, a throttle torque contribution is generally increasingly reduced as operator brake effort increases. Also, in a preferred embodiment, the throttle torque contribution is reduced less aggressively as the operator requested throttle increases. Preferably, a 100% throttle request results in no throttle torque reduction regardless of brake effort while a 0% throttle request results in the most aggressive or steepest reductions proportional to brake request.

A vehicle powertrain includes a prime mover, preferably a throttle-by-wire diesel or gasoline internal combustion engine and a transmission. The transmission may be a conventional electro-hydraulically controlled transmission coupled to the engine and selectively changing input/output ratios by friction torque transmitting elements such as clutches and brakes. The transmission may also be an electrically variable transmission including one or more electric machines for varying effective input/output ratios and providing hybrid functionality including regenerative braking. An electronic controller has among the various control programs stored for execution therein a set of instructions for establishing the output torque of the transmission. These instructions rely upon a variety of inputs including attained range and torque requests from the operator such as throttle requests and brake requests and establish an output torque in accordance with various torque contributions to the powertrain. Instructions are included for attenuating a first torque contribution which may be a throttle torque contribution determined in accordance with an operator throttle request, preferably as a function of an operator brake request. Preferably, the first one of the plurality of torque contributions includes a throttle torque contribution, a second one of the plurality of torque contributions includes a brake torque contribution, and the instructions apply a variable gain to the first one of the plurality of torque contributions that generally a) trends in one direction as an operator throttle request trends larger and b) trends in an opposite direction as an operator brake request trends larger.

DESCRIPTION OF THE PREFERRED EMBODIMENT

Figure 1:
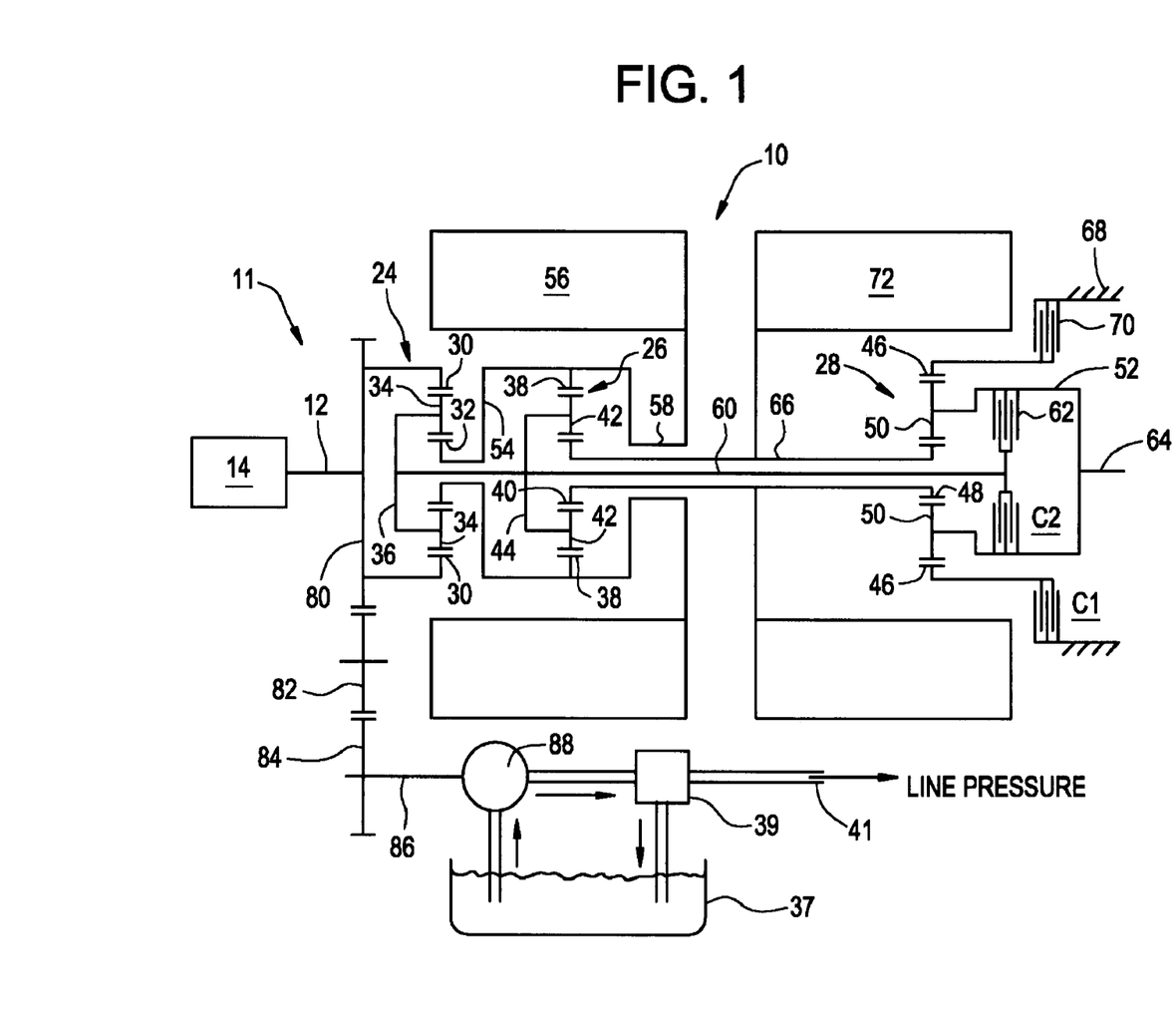
FIG. 1 is a mechanical hardware schematic representation of one preferred form of a two-mode, compound-split, electrically variable transmission particularly suited to the control of the present invention.
Figure 2:
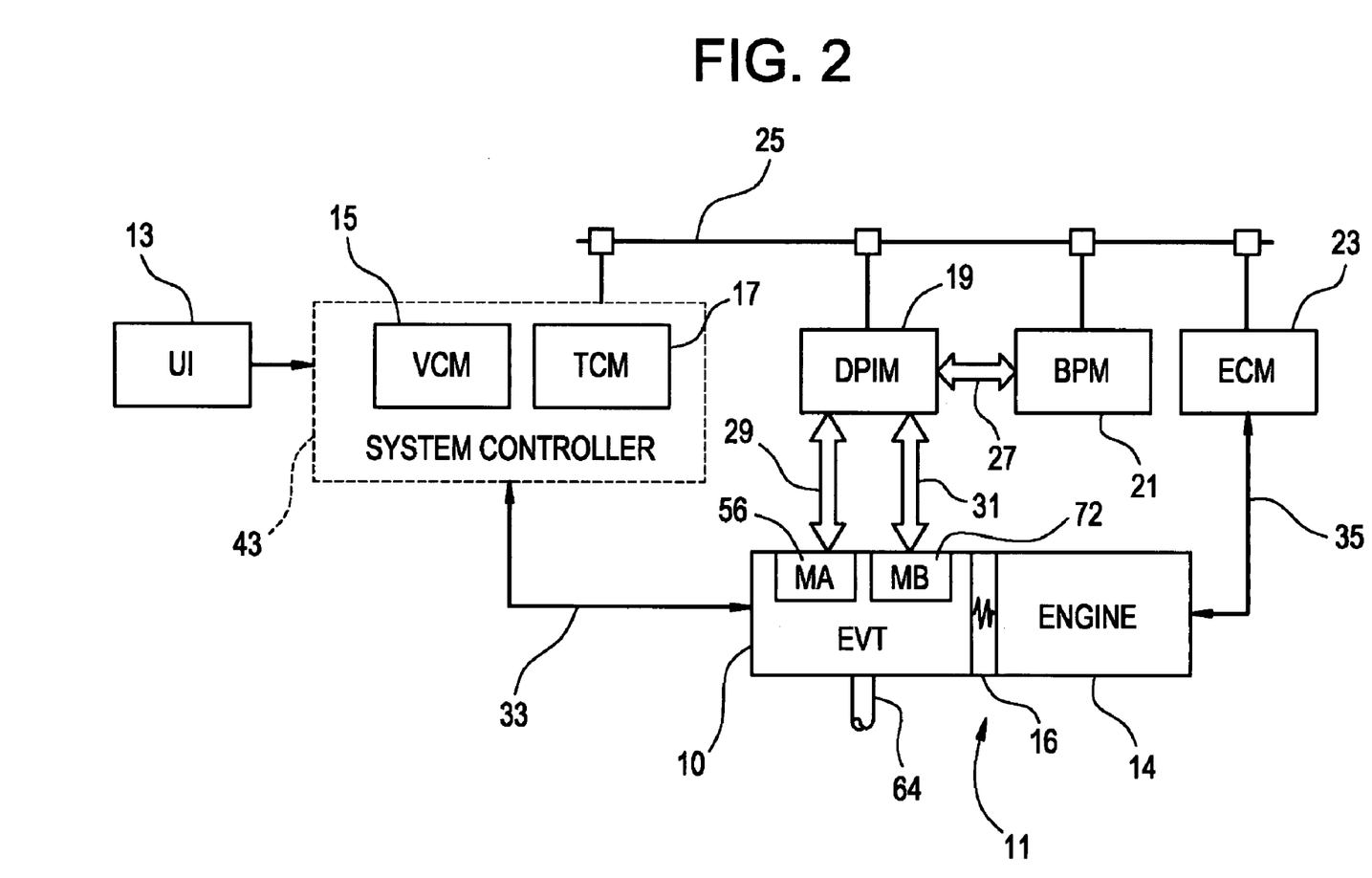
FIG. 2 is an electrical and mechanical schematic of a preferred system architecture for implementing the control of the present invention.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal.

Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 as vehicle throttle position, push button shift selector (PBSS) for available drive range selection (e.g. Drive, Reverse, etc.), brake effort and fast idle requests among others. Brake effort may, for example, be provided in pneumatic and hydraulic braking systems from conventional pressure transducers (not shown). Throttle position may, for example, be provided by conventional displacement sensors for transducing pedal travel.

System controller 43 determines a desired output torque, To_des, for use in the control of the powertrain. The determination of To_des is made based upon operator input factors such as accelerator pedal position and brake pedal position and vehicle dynamic conditions such as vehicle speed. Other operator input factors such as shift selector position and power take-off requests, vehicle dynamic conditions such as acceleration and deceleration rate, and EVT operational conditions such as temperatures, voltages, currents and speeds may also influence the determination of output torque. System controller 43 also determines the constitution of the output torque in terms of engine and electric machine contributions and splits. Additional details respecting determination of the various torque contributions to the EVT including output torque, engine torque and motors MA and MB torques is disclosed in detail in co-pending U.S. Ser. No. 10/686,511, which is incorporated herein by reference.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
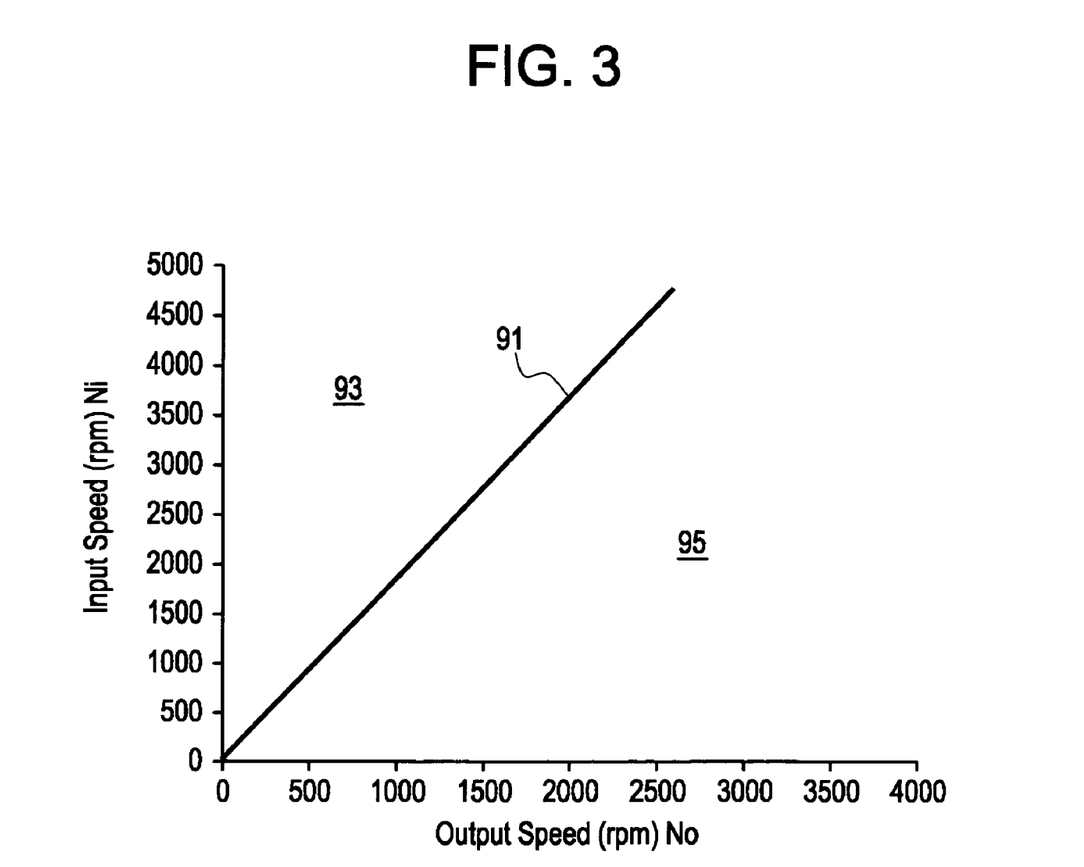
FIG. 3 is a graphical representation of various regions of operation with respect to input and output speeds of the exemplary EVT disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Figure 4:
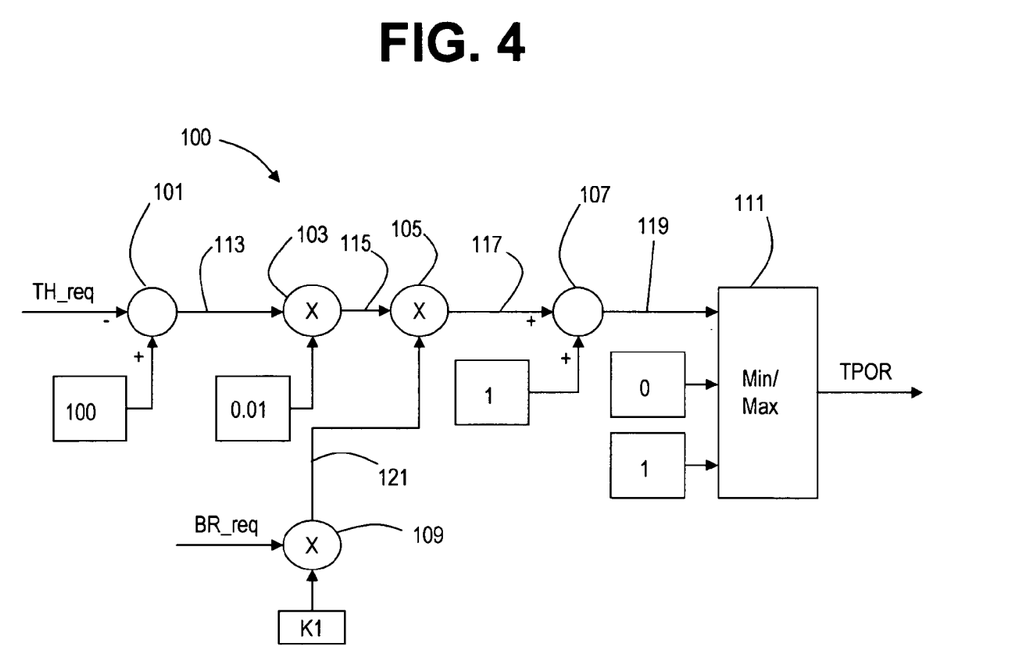
FIG. 4 is a control schematic illustrating a preferred approach to determining a throttle phase out factor in accordance with the present invention.
Figure 5:
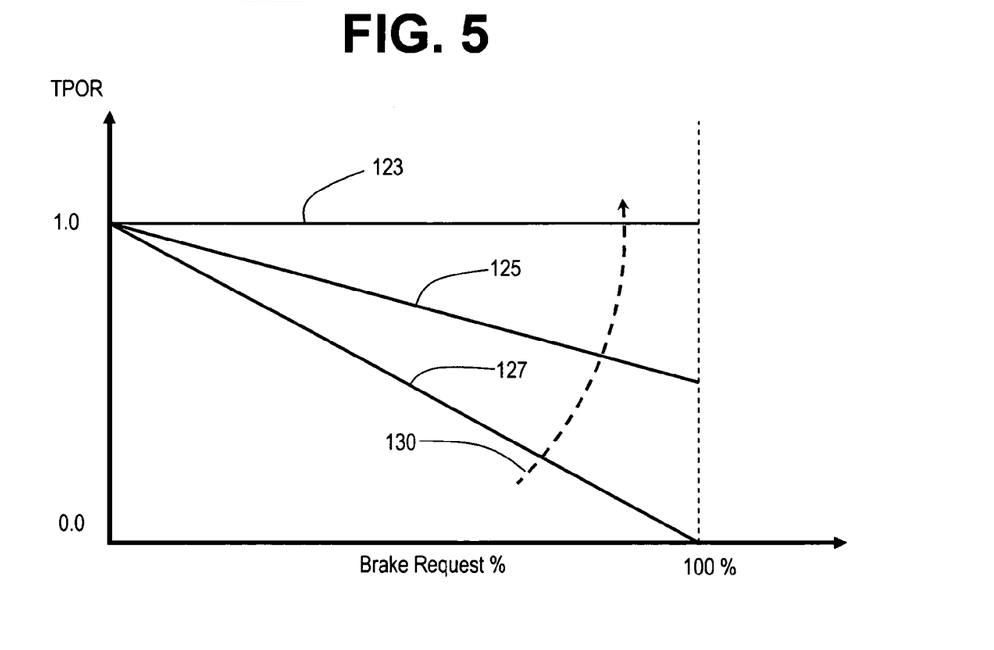
FIG. 5 is a graphical representation of exemplary resultant throttle phase out factors across operational ranges of throttle and brake; and, FIG. 6 is a control schematic illustrating a preferred approach to implementing a throttle phase out factor in a powertrain control.
Figure 6:
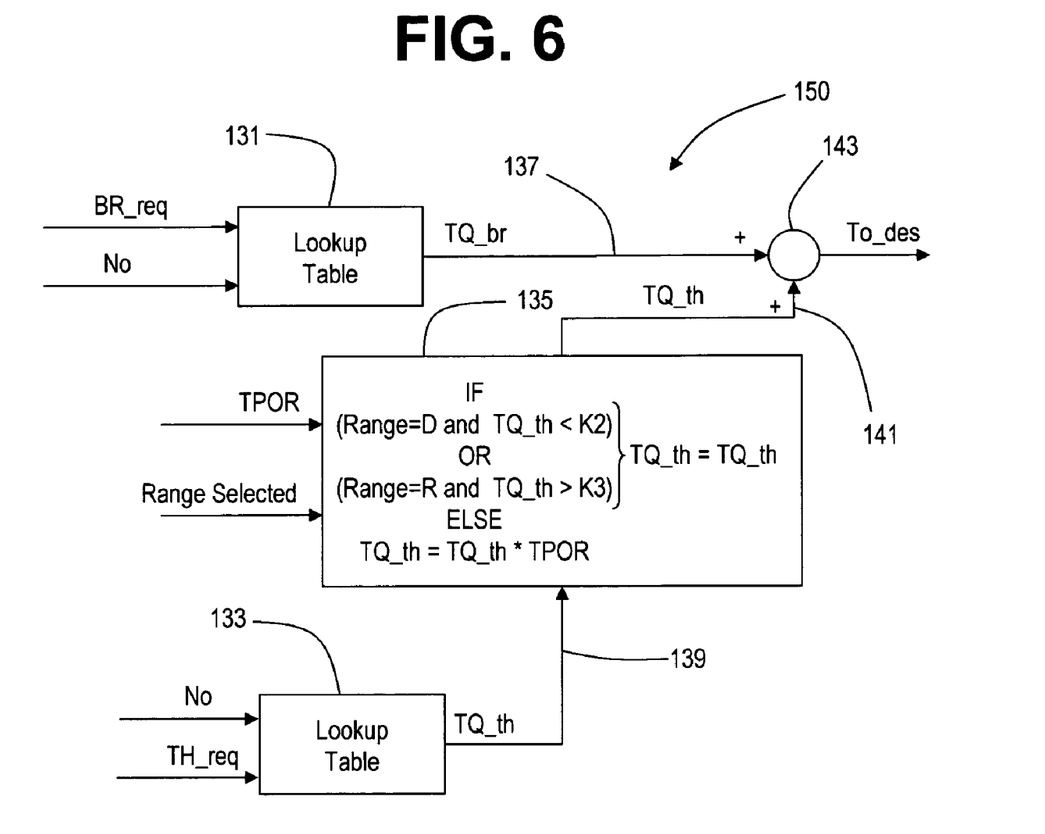

The general objective of resolving operator torque intent and providing accurate and pleasing driveability in accordance therewith is performed in accordance with the present invention described hereafter in an exemplary embodiment in conjunction with FIGS. 4–6. With reference first to FIG. 4, control 100 receives throtfie request signals, TH_req, and brake request signals, BR_req. Throttle and brake requests are provided as preprocessed, filtered and conditioned signals from throttle position and brake system pressure sensors, respectively. Preferably the request signals are scaled and available in a normalized range of 0 to 100 representing the percentage of a full request. For example, a completely depressed throttle pedal would result in a throtfie request signal equivalent to 100, whereas an operator stepping completely off of the throttle pedal would result in a throttle request signal equivalent to 0. Brake request is similarly scaled whereas no service brake pedal application results in a brake request signal of 0 and heavy service brake pedal application results in a brake request signal of 100 in accordance with system calibrations. Throttle request signals are summed at node 101 whereat the request signal is subtracted from the full scale signal quantity, e.g. 100. The resultant signal is output on line 113 and ranges from 0 to 100; however, the scale is inverted with respect to the throttle request signal. The signal on line 113 is then converted to a fractional percentage by multiplying it by weighting factor 0.01 at node 103 and providing the output on line 115. Generally, the larger the throttle request signal at the input, the smaller the signal on line 115. Next, the signal on line 115 is multiplied by signal on line 121 at node 105. The signal on line 121 is a negative factor derived as a function of the brake request signal. Generally, larger brake request signals at the input results in larger negative signal on line 121. In providing the signal on line 121, the brake request signal is multiplied by a factor, K1 at node 109. K1 is a negative calibration constant and is preferably a value of substantially −0.01. Other calibration constant magnitudes may be provided, the effects of which are discussed herein below. The output from node 105 on line 117 is a negative number, and in the present example will be between 0 and −1.0. The signal on line 117 is summed at node 107 with a unity factor of 1. The output from node 107 is provided on line 119. The signal on line 119 is next input to Min/Max block 111 to limit the signal in accordance with high and low setting, e.g. 0 and 1 in the present example. The output from Mm/Max block 111 is the throttle phase out ratio, TPOR, between 0 and 1. In the present example, TPOR will be 0 when throttle request is 100 or brake request is 0. Otherwise, TPOR is between 0 and 1, generally effected larger with smaller throttle requests and smaller with larger brake requests in accordance with the exemplary control 100.

With respect to FIG. 5, exemplary TPOR versus brake request lines labeled 123, 125 and 127 corresponding to 100%, 50% and 0% throttle, respectively, are illustrated. The illustration is with respect to the specific exemplary values and implementation described with respect to control 100 of FIG. 4. Trend arrow 130 merely indicates the general location trend for additional lines in accordance with the continuum of increasing throttle requests from 0% to 100%. Referring back to the calibration constant, K1, the chosen value thereof will have an effect that is most readily appreciated with reference to FIG. 5 and the location of TPOR lines therein. For example, larger negative values for K1 will result in smaller TPOR values for the same throttle and brake request signal. The general trend, therefore, of the TPOR lines is a downward pivot with the pivot point remaining at a TPOR of 1.0 at 0% brake request. Essentially, the TPOR lines would have a more negative slope with the overall result on the field of TPOR values being that TPOR is generally smaller at equivalent brake requests relative to the exemplary value of K1 (e.g. −0.01). It follows then that smaller negative values for K1 will result in larger TPOR values for the same brake request signal. The general trend, therefore, of the TPOR lines in this case is an upward pivot with the pivot point remaining at a TPOR of 1.0 at o% brake request. Essentially, the TPOR lines would have a less negative slope with the overall result on the field of TPOR values being that TPOR is generally larger at equivalent brake requests relative to the exemplary value of K1 (e.g. −0.01).

Turning now to FIG. 6, an exemplary implementation of the TPOR determined in accordance with exemplary control 100 of FIG. 4 is illustrated. Generally, the objective of control 150 is to establish a desired output torque To_des for use in control of the powertrain earlier described herein. Torque contributions in accordance with brake requests and throttle requests are exemplified in control 150 of FIG. 6. Brake and throttle torque contributions are summed at node 143 to provide resultant desired output torque, To_des. Additional torque contributions may be summed at node 143 in an equivalent fashion. For example, a power take-off torque term may be provided in similar fashion in accordance with an operator setting or request. Brake torque contribution is provided by brake torque signal, TQ_br, on line 137. It is provided, for example, by means of a look-up table 131. Exemplary table reference quantities are shown as the brake request signal, BR_req, already discussed earlier herein and the vehicle speed or output speed represented as No herein. Throttle torque contribution is provided by throttle torque signal, TQ_th, on line 141. TQ_th is provided by block 135 in accordance with throttle torque signal on line 139 and TPOR signal from control 100. Throttle torque signal on line 139 is provided, for example, by means of a look-up table 133. Exemplary table reference quantities are shown as the throttle request signal, TH_req, already discussed earlier herein and the vehicle speed or output speed represented as No herein. In the exemplary implementation with EVT, the results from look-up table 133 can be negative in Drive range as would be the case where regenerative braking is desirable.

TPOR is provided, as described, from control 100 to block 135. The other inputs to block 135 are, as described, throttle torque signal from line 139 and the EVT range, e.g. Drive (D) or Reverse (R). Block 135 provides exemplary logic for application of the TPOR to the throttle torque request signal on line 139. Throttle torque signals, TQ_th, indicative of regenerative braking torques, are passed directly through unmodified to line 141. As can be seen in block 135, if the selected range is Drive and throttle torque is less than a calibration constant K2, then throttle torque is not attenuated by the weighting of TPOR. Similarly, if the selected range is Reverse and throttle torque is greater than a calibration constant K3, then throttle torque is not attenuated by the weighting of TPOR. In each case of range being Drive or Reverse, the preferred calibration constants K2 and K3 are each equivalent to 0. Negative values for throttle torque while in Drive and positive values for throttle torque while in Reverse each correspond to regenerative braking conditions in the respective range. Where the range and regenerative torque test just described are not affirmative, the throttle torque is weighted by the throttle phase out ratio, TPOR. Generally then, as can be best seen with reference again to the TPOR trend lines illustrated in FIG. 5, relatively large throttle requests are attenuated less aggressively as a function of brake requests than are relatively small throttle requests.

The controls as described herein and as illustrated with respect to the control schematics of FIGS. 4 and 6 are preferably implemented as part of the executable computer code and data structures of system controller 43.

The present invention has been described with respect to a preferred implementation in conjunction with an electrically variable transmission and internal combustion engine complement including throttle by wire. However, conventional electro-hydraulic, multi-speed transmission and internal combustion engine complements including conventional mechanically linked or by-wire throttling can be used in conjunction with the present invention. One skilled in the art will recognize that in systems employing conventional mechanically linked throttling, throttle phase out would be accomplished with engine torque reduction techniques such as fuel control, spark timing control, valve control including phase, lift and deactivation, and other well known engine output torque controls.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for establishing a resultant output torque control term for an output member of a powertrain for use in a powertrain control comprising:
   providing a first output torque contribution term corresponding to a first torque request signal;
   reducing the first output torque contribution term in accordance with a first factor that varies inversely to said first torque request signal; and,
   combining the reduced first output torque contribution term with at least one other output torque contribution term to establish said resultant output torque control term.

2. The method for establishing a resultant an output torque control term for an output member of a powertrain as claimed in claim 1 wherein reducing the first output torque contribution term further includes reducing the first output torque contribution term in accordance with a second factor that varies proportionally to a second torque request signal.

3. The method for establishing a resultant output torque control term for an output member of a powertrain as claimed in claim 1 wherein said at least one other output torque contribution term corresponds to a brake torque request and said first torque request signal includes a throttle torque request.

4. The method for establishing a resultant output torque control term for an output member of a powertrain as claimed in claim 3 wherein reducing the first output torque contribution term further includes reducing the first output torque contribution term in accordance with a second factor that varies proportionally to said brake torque request signal.

5. Method for determining a powertrain output member torque control term comprising:
   providing a brake torque contribution term;
   providing a throttle torque contribution term;
   attenuating the throttle torque contribution term by applying a variable gain thereto that generally a) trends in one direction as a throttle request trends larger and b) trends in an opposite direction as a brake request trends larger; and,
   combining the brake torque contribution term and the attenuated throttle torque contribution term to establish said powertrain output member torque control term.

6. The method for determining a powertrain output member torque control term as claimed in claim 5 wherein said brake torque contribution term is provided in response to an operator brake request.

* * * * *